(12) United States Patent
Ponce Garcia et al.

(10) Patent No.: US 10,853,004 B2
(45) Date of Patent: Dec. 1, 2020

(54) CALIBRATING COMMUNICATION LINES

(71) Applicant: HEWLETT-PACKARD DEVELOPMENT COMPANY, L.P., Spring, TX (US)

(72) Inventors: Xavier Ponce Garcia, Barcelona (ES); Jordi Hernandez Creus, Barcelona (ES); Ricard Silvestre, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/467,881

(22) PCT Filed: Apr. 20, 2017

(86) PCT No.: PCT/US2017/028609
§ 371 (c)(1),
(2) Date: Jun. 7, 2019

(87) PCT Pub. No.: WO2018/194616
PCT Pub. Date: Oct. 25, 2018

(65) Prior Publication Data
US 2020/0089438 A1    Mar. 19, 2020

(51) Int. Cl.
*G06F 3/12* (2006.01)
*H04B 3/04* (2006.01)
(Continued)

(52) U.S. Cl.
CPC ............ *G06F 3/121* (2013.01); *G06F 3/1234* (2013.01); *H04B 3/04* (2013.01); *H04L 7/0041* (2013.01); *H04L 7/048* (2013.01)

(58) Field of Classification Search
CPC combination set(s) only.
See application file for complete search history.

(56) References Cited

U.S. PATENT DOCUMENTS

| 6,680,636 B1 * | 1/2004 | Parry ........................ G06F 1/10 327/161 |
| 6,866,367 B2 | 3/2005 | Szumla |

(Continued)

FOREIGN PATENT DOCUMENTS

| CA | 2933452 A1 | 7/2007 |
| CA | 2808042 A1 | 9/2013 |
| JP | S5967740 | 4/1984 |

OTHER PUBLICATIONS

HP Scitex Fb500, Fb700 Service Manual; 2014; http://manualmachine.com/hp/scitex-fb500-fb700/195668-service-manual/page:16/.

*Primary Examiner* — Helen Zong
(74) *Attorney, Agent, or Firm* — HP Inc. Patent Department

(57) ABSTRACT

Devices and methods for calibrating communication lines are disclosed. A clock sets a frequency of transmission through a communication line. A delay compensator, comprising multi-tap delay lines introduces delays in a transmitted message to compensate for skew in the communication line. An error comparator, coupled to the delay compensator, identifies errors in the messages transmitted through the multi-tap delay lines above an error margin. A delay selector, coupled to the error comparator and to the delay compensator, selects taps of the multi-tap delay lines of the delay compensator. Taps of the multi-tap delay lines where no errors are identified for the selected clock frequency are stored in a memory.

20 Claims, 9 Drawing Sheets

(51) Int. Cl.
*H04L 7/00* (2006.01)
*H04L 7/04* (2006.01)

(56) References Cited

U.S. PATENT DOCUMENTS

| | | |
|---|---|---|
| 8,116,162 B1 * | 2/2012 | Wennekamp .... H03K 19/17736 |
| | | 365/194 |
| 9,102,139 B2 | 8/2015 | Soto et al. |
| 9,269,029 B2 | 2/2016 | Sempere Agullo et al. |
| 9,325,434 B2 | 4/2016 | Melanson et al. |
| 9,577,771 B1 | 2/2017 | Lashkarian et al. |
| 2007/0013334 A1 | 1/2007 | Wirtz et al. |
| 2007/0176656 A1 * | 8/2007 | Lesso .................... H03L 7/0812 |
| | | 327/158 |
| 2010/0103746 A1 * | 4/2010 | Ma ........................ G11C 7/1066 |
| | | 365/189.05 |
| 2015/0045977 A1 | 2/2015 | Xia et al. |
| 2016/0033455 A1 | 2/2016 | Knierim et al. |
| 2016/0360045 A1 | 12/2016 | Doyle et al. |
| 2016/0373119 A1 * | 12/2016 | Wei ........................ H03L 7/0814 |
| 2017/0039163 A1 * | 2/2017 | Sejpal .................. G06F 13/4291 |
| 2017/0120584 A1 * | 5/2017 | Kondo ................. B41J 2/04581 |
| 2018/0370228 A1 * | 12/2018 | Tamura ....................... B41J 3/30 |
| 2019/0150883 A1 * | 5/2019 | Maharbiz ............... A61B 5/686 |
| 2019/0273475 A1 * | 9/2019 | Ye ............................. H03F 1/26 |

* cited by examiner

US 10,853,004 B2

CALIBRATING COMMUNICATION LINES

BACKGROUND

Communication lines transmit information between a source (transmitter) and a destination (receiver). Wired communication refers to the transmission of data over a wire-based communication technology. Wired communication may be single-ended or differential. In single-ended communication lines one wire may carry a varying voltage that represents the signal, while the other wire may be connected to a reference voltage, usually ground. Differential communication lines transmit information as the difference between voltages on a pair of wires. An example of such a line is a twisted-pair copper cable line. A differential communication line may comprise multiple parallel pairs of wires.

BRIEF DESCRIPTION

Figure 1:
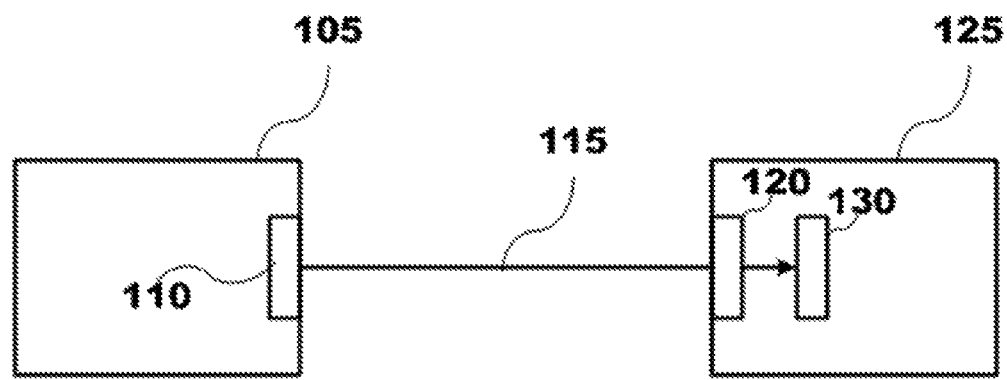
Figure 2:
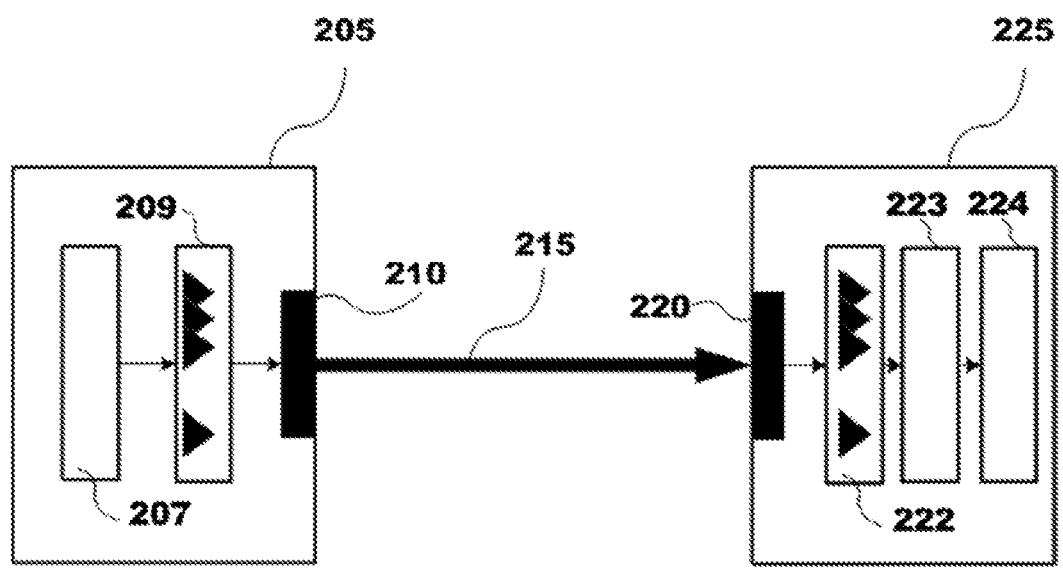
Figure 3A:
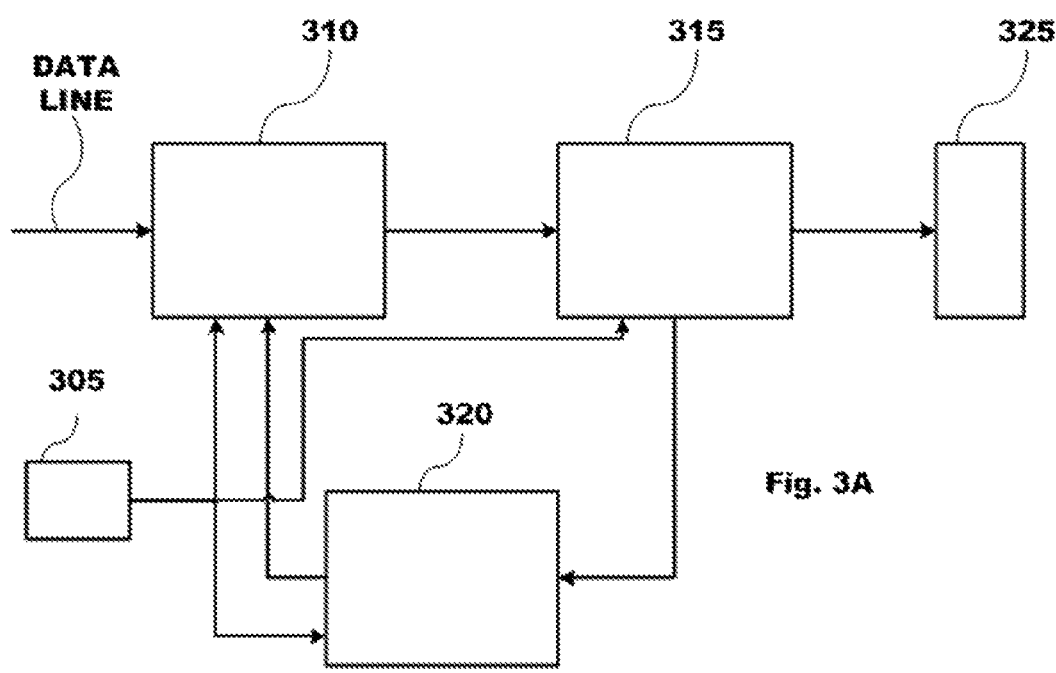
Figure 3B:
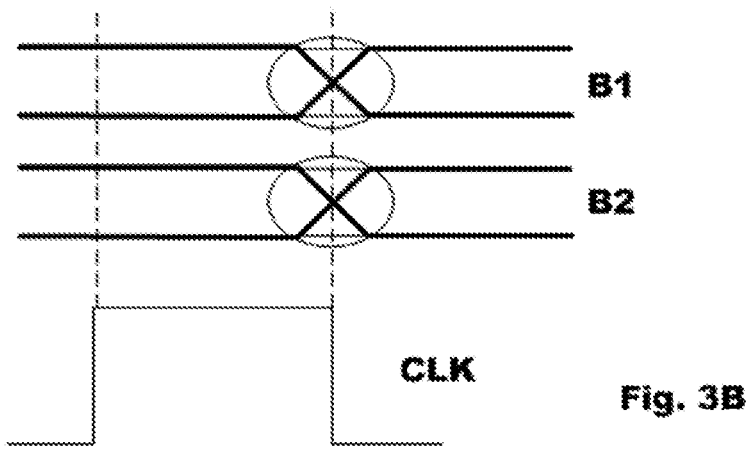
Figure 3C:
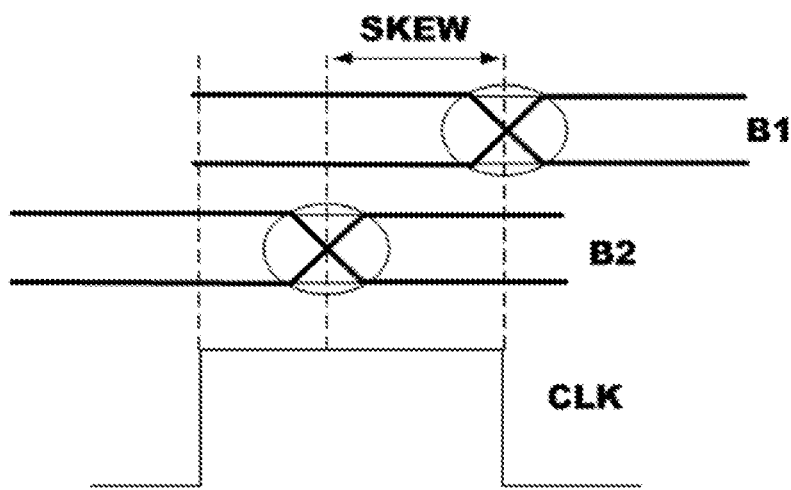
Figure 3D:
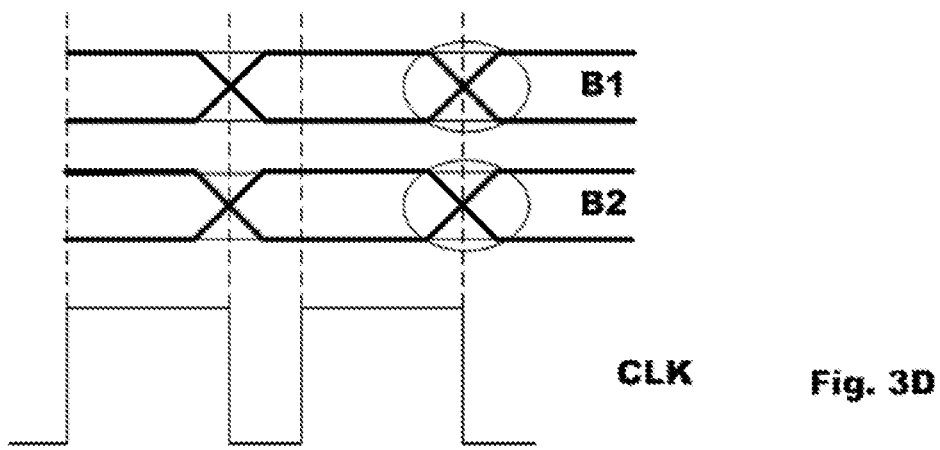
Figure 4:
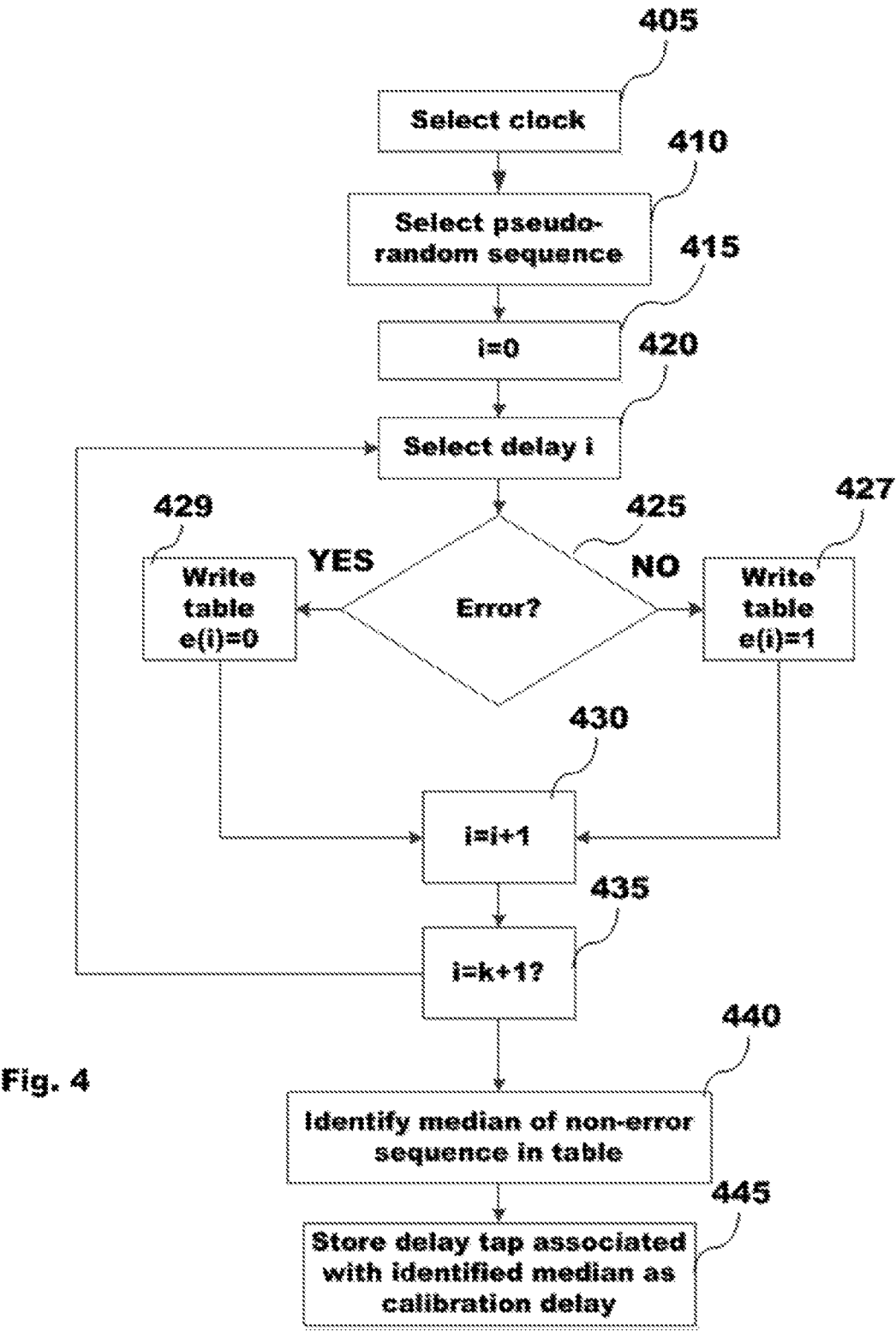
Figure 5:
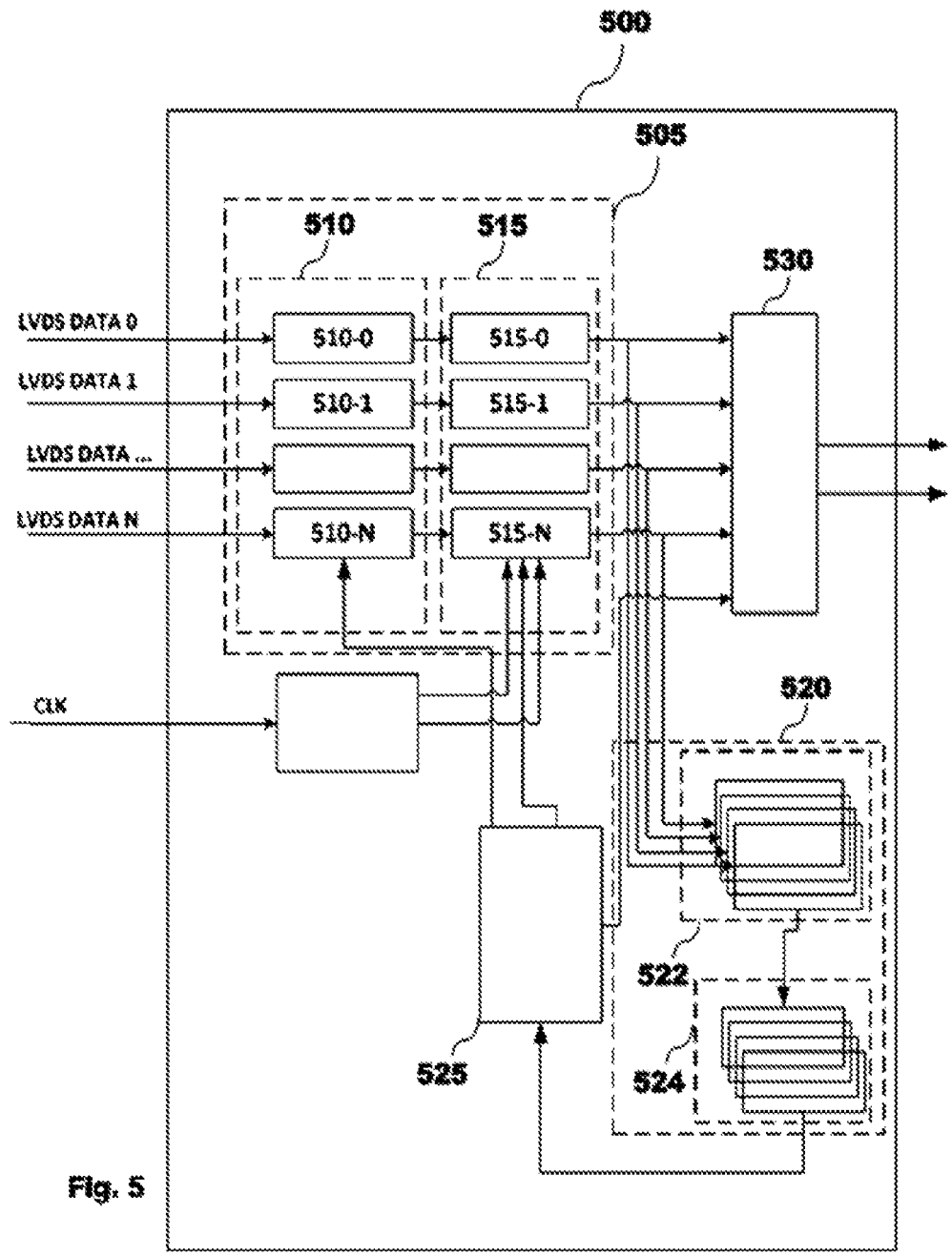
Figure 6:
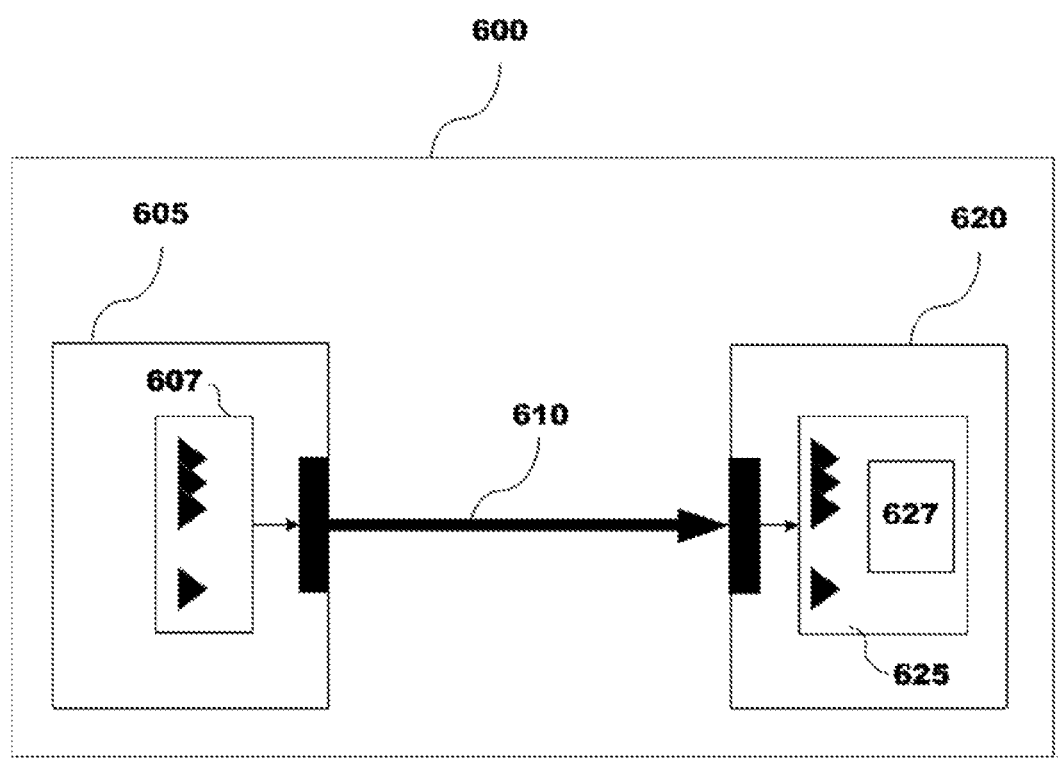
Figure 7:
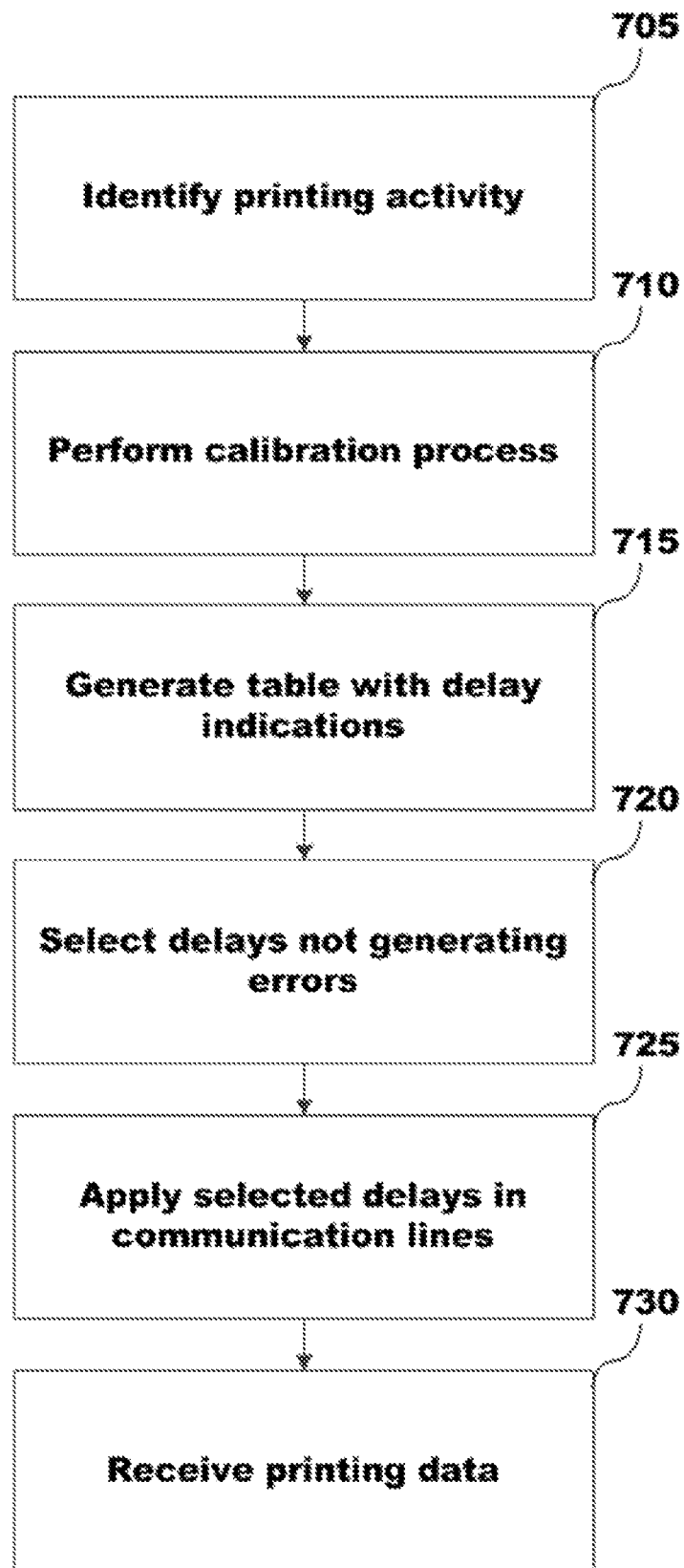
Figure 8:
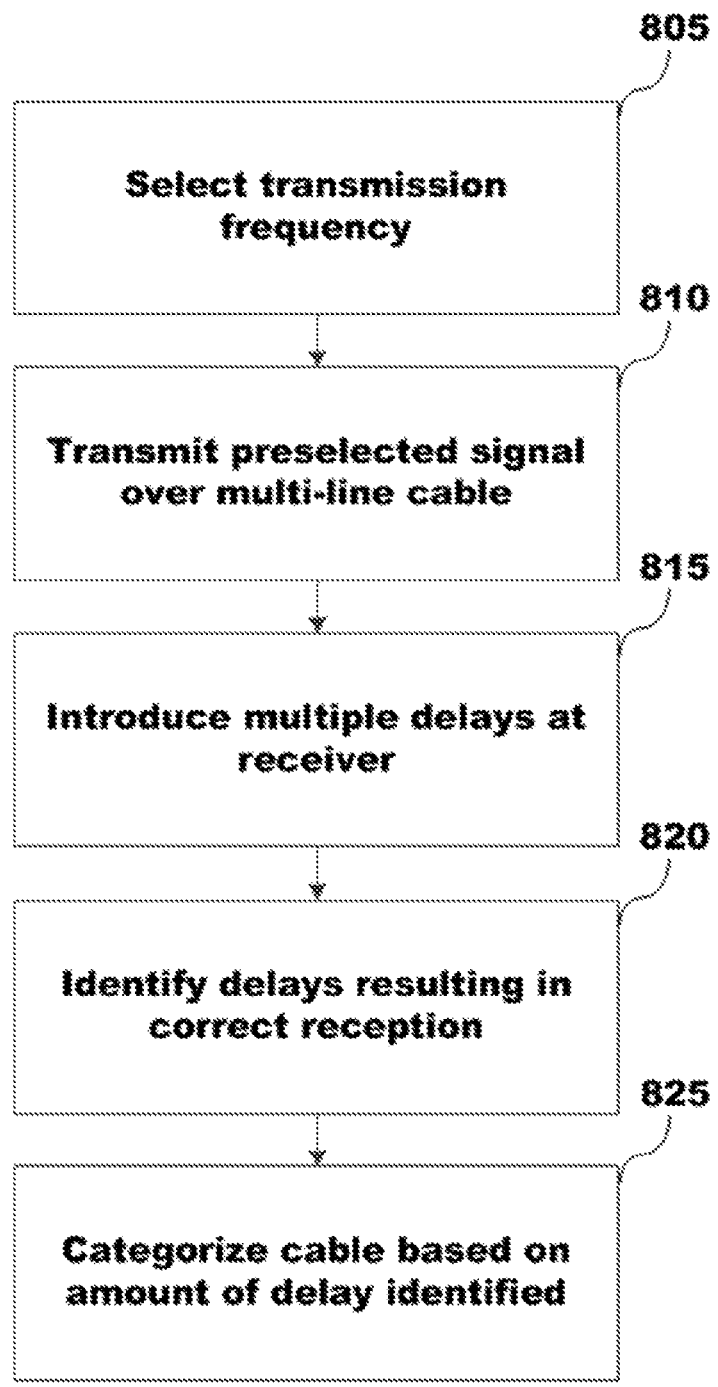

Some non-limiting examples of the present disclosure are described in the following with reference to the appended drawings, in which:

FIG. 1 schematically illustrates a communication line connecting a transmitter and a receiver according to an example;

FIG. 2 schematically illustrates a differential communication line according to an example;

FIG. 3A schematically illustrates a device to calibrate a differential communication line, according to an example;

FIG. 3B schematically illustrates a diagram of bit sequences as transmitted over a multi-pair cable according to an example;

FIG. 3C schematically illustrates a diagram of bit sequences as received over a multi-pair cable with skew according to an example;

FIG. 3D schematically illustrates a diagram of received bit sequences after skew has been compensated according to an example;

FIG. 4 is a flow diagram of a method of calibrating a differential communication line, according to an example;

FIG. 5 schematically illustrates a device to calibrate a differential communication line, according to another example;

FIG. 6 schematically illustrates a block diagram of a printer comprising a skew calibration device according to an example;

FIG. 7 schematically illustrates a flow diagram of operating a printer using cable calibration logic according to an example;

FIG. 8 schematically illustrates a flow diagram of a method of categorizing cables according to an example.

DETAILED DESCRIPTION

A differential wire pair may carry a data channel at a data rate that is a factor of a clock's frequency. To increase the data rate, in single-ended as well as in differential communication lines, multiple serial data channels may be grouped in parallel and a parallel clock channel may be added for synchronization.

Multi gigabit-per-second data-throughput applications, such as the communication line between a printer's engine board and the printer's carriage board in a large format printer (LFP), specify a cable length of up to nine meters, a bandwidth above 4 Gbps and multi-million cycle communication systems. Twisted-pair cables with Small Computer System Interface (SCSI) connectors may provide cable lengths up to 9 meters and more than 3 million scan cycles.

FIG. 1 schematically illustrates a communication line connecting a transmitter and a receiver. The communication line may be connecting a printer's engine board with the printer's carriage board. Engine board 105 may comprise a connector 110. A multi-wire cable 115 may be coupled at one end to the connector 110 and at the other end to connector 120 of carriage board 125. In a multi-wire communication line, the bandwidth of the cable may be limited by skew between the wires of the cable. The receiver, e.g. the carriage board, may sample the received data synchronously with the transmitted clock. When the frequency increases, skew between the wires may generate errors in the transmission during the sampling of the input signal at the sampling point. To counter skew, cable calibration logic 130 may be used at the receiver.

For high bandwidth applications, such as the communication between a printer's engine board with the printer's carriage board, a communication line following a low-voltage differential signal (LVDS) serial communication protocol may be used. FIG. 2 schematically illustrates a differential communication line. Transmitter 205 may comprise a data processor 207, a low-voltage differential signal (LVDS) transceiver 209 and a connector 210. Receiver 225 may comprise a connector 220, an LVDS transceiver 222 and a data processor 224. A multi-pair cable 215 may be coupled between connectors 210 and 220. The multi-pair cable may carry a dock signal and multiple LVDS data channels. The clock signal may be used to sample the LVDS data. The LVDS channels may be sampled synchronously. Thus, skew between the data channels may limit the sampling frequency and therefore the bandwidth of the differential communication line. Furthermore, skew may be a factor of the cable's length. Thus, longer cables may suffer more skew than shorter cables. As a result, bandwidth of longer cables may be reduced compared to bandwidth of shorter cables. To counter the effect of skew, calibration of the differential communication line with cable calibration logic 223 is proposed at the receiver as part of LVDS transceiver 222 or between LVDS transceiver 222 and data processor 224.

FIG. 3A schematically illustrates a device to calibrate a differential communication line. The device may comprise a clock 305. The clock 305 may set a frequency of transmission through the differential communication line. The device may further comprise a delay or skew compensator 310. The delay compensator 310 may comprise multi-tap delay lines. The multi-tap delay lines may introduce delays in a received message. The introduced delays may compensate for skew in the differential communication line. The device may further comprise an error comparator 315. The error comparator may be coupled to the delay compensator 310. The error comparator 315 may identify errors in the messages transmitted through the multi-tap delay lines. The error identification may be based on a, e.g. preselected, error margin. The device may further comprise a delay selector 320. The delay selector 320 may be coupled to the error comparator 315 and to the delay compensator 310. The delay selector 320 may select taps of the multi-tap delay lines of the delay compensator 310. The device may further comprise a memory 325 to store tap indicators of the multi-tap delay lines where no errors are identified for the selected clock frequency. The tap indicators may be stored in a table entry of the memory. Each table entry may correspond to a tap. Each table entry may store an indication of correct or incorrect transmission. By filling in the table entries with the various selected tap delays, the device may identify a tap range of correct transmission. Then, a median tap of the identified range may be selected and the corresponding delay may be applied to the communication line.

FIG. 3B schematically illustrates a diagram of bit sequences as transmitted over a multi-pair cable. At transmission, the bit sequences B1 and B2 may be aligned to be transmitted synchronously based on the clock frequency during a sampling window. FIG. 3C schematically illustrates a diagram of bit sequences B1 and B2 as received over a multi-pair cable with skew. As indicated in FIG. 3C, the bit sequence B1 may arrive earlier than the bit sequence B2 due to skew between the pairs. Thus, unless the sampling window is big enough to account for the delay, then synchronous sampling may result in errors at the receiver. However, a bigger sampling window may result in a lower transmission frequency. FIG. 3D schematically illustrates a diagram of bit sequences B1 and B2 after skew has been compensated. As may be seen, using a skew compensator as the one described with reference to FIG. 3A, the bit sequences may be aligned after reception and synchronous sampling may thus be performed at higher frequencies, compared to when no skew compensator is present.

FIG. 4 is a flow diagram of a method of calibrating a differential communication line, according to an example. In block 405, a clock frequency is selected. Then in block 410, a known sequence is selected for transmission. The known sequence may be a pseudo-random sequence, e.g. a polynomial pseudo-random sequence. Then, in block 415 a meter i may be set to 0. The meter may correspond to a delay index. The calibration system may comprise k number of delays, e.g. tap delays. In block 420, delay i may be selected. The selected known sequence may then be transmitted, e.g. by a printer engine board, and received with a delay i by the receiver, e.g. by a printer carriage board. In block 425, it may be checked if the received sequence has been received correctly. If the sequence is received correctly then, in block 427, a table entry in a memory corresponding to the introduced delay may be written or updated with an indication of successful reception. Otherwise, in block 429, a table entry in a memory corresponding to the introduced delay may be written or updated with an indication of unsuccessful reception. For example, the table may comprise a binary matrix and the indication may be "1" for successful reception and "0" otherwise. In block 430, the index i may be incremented by 1. In block 435, it may be checked if the index i has exceeded k, i.e. if all delays have been tested. If this may not be the case, then the process may select the next delay in block 420. Otherwise, in block 440, a median of the table entries corresponding to correct reception may be identified. In block 445, the delay tap associated with the identified median table entry may be stored and used as a calibration delay for the differential communication line.

FIG. 5 schematically illustrates a device to calibrate a differential communication line, according to another example. The communication line may comprise N+1 number of data lines, e.g. N+1 LVDS lines, and a clock line. The clock line may be transmitted synchronously with the data lines. The clock line may set a frequency of transmission through the differential communication line, i.e. through the N+1 data lines. The device 500 may comprise a delay compensator 505. The delay compensator 505 may comprise a fine compensator 510 and a coarse compensator 515. The fine compensator 510 may comprise N+1 fine delay blocks (510-0 to 510-N). Each fine delay block may comprise delay taps. The coarse compensator 515 may comprise a serial to parallel register. The serial to parallel register may comprise N+1 coarse delay blocks or "bitslips" (515-0 to 515-N). Each coarse delay block may correspond to a bitslip position. Each coarse delay block may be coupled to the output of a corresponding fine delay block. The output of the coarse delay blocks may generate alignments of the data words at their input. Each alignment may correspond to a bitslip position of the coarse delay block.

In one implementation, the delay compensator may comprise 8 coarse delay blocks and 8 fine delay blocks. Each fine delay block may comprise 32 taps. Each tap may generate a delay of 78 ps. Thus, each fine delay block may provide a delay of up to 2496 ps (32×78 ps). This delay corresponds to a frequency of approximately 400 MHz (1/2496 ps). Thus, when the clock frequency is set at 400 MHz, any transmission with skew may be picked up during sampling as the delay windows may cover the time between samplings. The output of the coarse delay blocks may be coupled to the input of an error comparator 520. The error comparator 520 may comprise descramblers 522 coupled to error counters 524. The descramblers 522 may comprise N+1 descramblers, one for each data line, to receive the message sequences from the coarse delay lines and identify errors in the transmission. Accordingly, the error counters 524 may comprise N+1 error counters, one for each descrambler. The error counters may receive the identified errors and count the errors per data line. The error comparator 520 may be coupled to delay controller 525. The delay controller 525 may be coupled to the fine and coarse delay blocks and may comprise circuitry, such as a processor and a memory storage having a delay control instructions for operating the circuitry to perform control of the fine and coarse delay blocks. The delay controller 525 may receive the error count from the error comparator 520 and provide the delay control instructions or signals corresponding to the delay control instructions to the fine and coarse delay blocks to select a next tap and/or bitslip for testing the delay and for calibrating the differential communication lines. The results of the delay testing may be stored in a memory 530.

In one example, the device may be implemented using field programmable gate arrays (FPGA). During calibration, the transmitter FPGA may send continuously the calibration sequence, (e.g. a pseudo-random sequence) and also the associated clock. The receiver FPGA may wait to get locked to the transmitted dock. Then, the receiver FPGA may checks if there is activity in the cable in order to start the calibration process. For example, it may check for input data other than all ones or zeros. For each input it may have an independent pseudo-random receiver that may get locked with the transmitter sequence. For each input a selected bitslip and a selected delay (tap) may be tested. If there are no errors in a selected period of time, this selected pair of bitslip and delay may be considered as valid. This process may be repeated for all bitslips and in each bitslip, all delay positions may be tested. Finally a table may be generated inside a RAM in the FPGA and the FPGA may select for each input a sampling delay and bitslip for each input.

The following (hexadecimal) table is an example of a table generated for a differential communication line:

TABLE 1

| Bitslip | Delay taps |
|---|---|
| 0 | 00 00 00 00 |
| 1 | 00 ff ff 00 |
| 2 | 00 00 00 00 |
| 3 | 00 00 00 00 |

TABLE 1-continued

| Bitslip | Delay taps |
|---|---|
| 4 | 00 00 00 00 |
| 5 | 00 00 00 00 |
| 6 | 00 00 00 00 |
| 7 | 00 00 00 00 |

In the example Table 1, delay taps within bitslips 0 and 2-7 generate errors. Thus corresponding data entries may be set to "0". In bitslip 1, sixteen of the delay taps (out of 31 delay taps), in the example the delay taps 8-23, may provide valid messages. Thus corresponding data entries may be set to "f". A median tap, e.g. tap 16, may be selected to calibrate the corresponding differential line.

FIG. 6 schematically illustrates a block diagram of a printer comprising a skew calibration device. Printer 600 may comprise a print engine board 605. The print engine board may generate print data. An LVDS transceiver 607 of the printer engine board 605 may be coupled at one end of a multiple-pair cable 610 to transmit the generated data over the multiple-pair cable 610. The multi-pair cable may carry a clock signal and multiple LVDS data channels. The clock signal may be used to sample the LVDS data. The printer may further comprise a printer carriage board coupled at the other end of the multiple-pair cable 610. The printer carriage board 620 may comprise an LVDS transceiver 625 with cable calibration logic 627. The cable calibration logic 627 may receive the print data and apply corresponding delays to the LVDS data lines to compensate for skew over the multiple-pairs of the cable. Thus, using the cable calibration logic, data may be sampled correctly at the printer carriage board 620.

FIG. 7 schematically illustrates a flow diagram of operating a printer using cable calibration logic. In block 705, printing activity may be identified. Then, in block 710, a cable calibration process may be performed as disclosed herein. During cable calibration a dock frequency may be selected. In block 715, a table with indications of delays may be generated. In block 720, delays not generating errors, i.e. skew-compensating delays, may be selected. In block 725, selected skew-compensating delays may be applied to the data lines. In block 730, printing data may be received at the selected frequency.

The proposed calibration techniques may be applied to communication lines, e.g. communication lines between engine boards and carriage boards of LFPs, supporting cables of up to 9 meters, multi-giga-bit-per-second bandwidths and multi-million scan cycles. The proposed technique may be implemented using FPGAs. The FPGA may be programmed to select the parameters, e.g. the median delay as represented in the table stored in the memory, using a pseudo-random binary sequence. It may also be used to qualify cables during a cable selection process by measuring skew. Cables with minimum skew may be selected for applications with extended scan cycles whereas cables with more skew may be used for less demanding applications or not selected at all.

FIG. 8 schematically discloses a flow diagram of a method of categorizing cables according to an example. In block 805, a clock (transmission) frequency may be selected. In block 810, a pseudo-random signal may be transmitted through a multi-line cable. The multi-line cable may be a multi-wire, single ended cable or a multi-pair differential cable. In block 815, multiple delays may be introduced in the received signal. In block 820, delays resulting in correct reception of the transmitted signal may be identified and stored in a delay table. In block 825, the cable may be categorized based on the amount of delay used for correct reception. That is, cables where less delay may be introduced to compensate for skew may be usable with higher frequencies than cables where more delay is introduced. Thus various categories of cables and corresponding cable lengths may be generated and used subsequently to select appropriate cables for applications at higher or lower frequencies.

It will be appreciated that examples described herein may be realized in the form of hardware or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disc or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings), may be replaced by alternative features serving the same, equivalent or similar purpose, unless expressly stated otherwise.

Although a number of particular implementations and examples have been disclosed herein, further variants and modifications of the disclosed devices and methods are possible. As such, representative examples of the present disclosure have utility over a wide range of applications, and the above discussion is not intended and should not be construed to be limiting, but is offered as an illustrative discussion of aspects of the disclosure. Many variations are possible within the spirit and scope of the disclosure, which is intended to be defined by the following claims—and their equivalents—in which all terms are meant in their broadest reasonable sense unless otherwise indicated.

The invention claimed is:

1. A device to calibrate a communication line, comprising:
    a clock to set a frequency of transmission through the communication line;
    a delay compensator, comprising multi-tap delay lines to introduce delays in a transmitted message to compensate for skew in the communication line;
    an error comparator, coupled to the delay compensator, to identify errors in the messages transmitted through the multi-tap delay lines above an error margin;
    a delay selector, coupled to the error comparator and to the delay compensator, to select taps of the multi-tap delay lines of the delay compensator; and
    a memory to store taps of the multi-tap delay lines when no errors are identified for the selected clock frequency.

2. The device according to claim 1, comprising a plurality of communication lines.

3. The device according to claim 1, wherein the delay compensator comprises a fine compensator and a coarse compensator.

4. The device according to claim 3, wherein the fine compensator comprises a multi-tap delay line.

5. The device according to claim 3, wherein the coarse compensator comprises a serial to parallel register.

6. The device according to claim 1, wherein the error comparator comprises an error counter.

7. The device according to claim 1, wherein the communication line is a single-ended communication line or a differential communication line.

8. The device of claim 1, wherein the communication line is a differential communication line comprising a number of paired wires, each pair for transmitting a differential signal.

9. The device of claim 1, wherein the delay selector selects a median tap of a tap range demonstrated to transmit messages within the error margin.

10. A method of calibrating a communication line comprising:
   setting a frequency of communication;
   sending a predetermined message over the communication line;
   receiving the predetermined message at a delay compensator;
   delaying sampling of the predetermined message using selected tap delays;
   for each selected tap delay, performing comparison of the sampled delayed message with the transmitted predetermined message; and
   storing indications of the result of the performed comparisons in a table.

11. The method according to claim 10, wherein sending a predetermined message comprises sending a pseudorandom bit sequence.

12. The method according to claim 10, storing indications comprises storing an indication of a sampling delay to compensate for skew along the communication line.

13. The method according to claim 10, comprising sending multiple predetermined messages along parallel communication lines.

14. The method of claim 10, further comprising identifying a tap range stored in the table that results in a comparison between the sampled delayed message and the transmitted predetermined message that is within an error margin.

15. The method of claim 14, further comprising selecting a median tap in the identified tap range as an operating tap for delaying the transmission of messages over the communication line.

16. A printer comprising:
   a printer engine board;
   a printer carriage board;
   a cable connecting the printer engine board and the printer carriage board;
   a clock to set a data rate of transmission through the cable; wherein,
   the printer carriage board comprises cable calibration logic to compensate skew of the cable, the cable calibration logic comprising:
   a delay compensator to introduce selected delays in a transmitted message;
   an error comparator, coupled to the delay compensator, to identify errors in the messages transmitted through the delay compensator;
   a delay selector, coupled to the error comparator and to the delay compensator, to select delays of the delay compensator; and
   a memory to store indications of the errors identified for the selected delays.

17. The printer according to claim 16, wherein the cable calibration logic comprises a field-programmable gate array (FPGA).

18. The printer according to claim 16, comprising a large format printer.

19. The printer of claim 16, wherein the cable is a differential communication line comprising a number of paired wires, each pair for transmitting a differential signal.

20. A method of categorizing a multi-line cable, comprising:
   selecting a signal transmission frequency;
   transmitting a preselected signal over the multi-line cable;
   introducing multiple delays to the received signal;
   identifying delays, from the multiple introduced delays, resulting in correct reception of the preselected signal; and
   categorizing the cable based on the identified delays.

* * * * *